United States Patent [19]

Pelletier et al.

[11] Patent Number: 5,212,649

[45] Date of Patent: May 18, 1993

[54] ELECTRONIC ROBOT KEY DISTRIBUTOR

[76] Inventors: Florent Pelletier, 3319-51st Avenue, Apt. 308, Red Deer, Alberta T4N 6H9; Lionel Coulombe, 17785 Charles, Ste. Janvier, Mirabel PQ J0N1L0, both of Canada

[21] Appl. No.: 500,187

[22] Filed: Mar. 28, 1990

[51] Int. Cl.⁵ .......................... G06F 15/24; B65G 1/04
[52] U.S. Cl. .................................... 364/479; 221/120; 221/122
[58] Field of Search .................. 364/478, 479; 221/83, 221/87, 119, 120, 121, 122; 340/825.35, 825.32; 235/382, 382.5

[56] References Cited

U.S. PATENT DOCUMENTS

| 2,678,251 | 11/1950 | Stewart | 221/120 |
|---|---|---|---|
| 3,243,780 | 3/1966 | Bendick et al. | 340/825.35 |
| 4,519,522 | 5/1985 | McElwee | 364/479 |
| 4,717,816 | 1/1988 | Raymond et al. | 235/382.5 |
| 4,812,985 | 3/1989 | Hambrick et al. | 364/479 |
| 4,814,592 | 3/1989 | Bradt et al. | 364/479 |
| 4,882,474 | 11/1989 | Anderl et al. | 340/825.32 |

FOREIGN PATENT DOCUMENTS 8713172  3/1989  France .

Primary Examiner—Jerry Smith
Assistant Examiner—Patrick D. Muir
Attorney, Agent, or Firm—Price, Heneveld, Cooper, DeWitt & Litton

[57] ABSTRACT

An apparatus for storing, dispensing and keeping track of articles, such as keys, has a plurality of compartments for the articles arranged in a cylindrical array, with openings, one for each compartment, being arranged on the surface of the cylinder. The apparatus is in a protective cabinet or housing. An access port arrangement is moveable in a slot in the cabinet parallel to the longitudinal axis of the cylinder and means are provided for rotating the cylinder and for moving the access port mechanism so that the access port can align with a selected one compartment to permit access to that compartment only at any one time. Control means, such as a computer, controls the rotating and the access port moving means so that, by identifying each article by a unique value, and dedicating an individual compartment to each separate article, the compartment specific to that article is accessed as required. A hierarchical access system for persons using the apparatus is also described.

12 Claims, 4 Drawing Sheets

ELECTRONIC ROBOT KEY DISTRIBUTOR

The present invention relates to an apparatus for storing and dispensing articles using a compartment system in which deposit into the apparatus and subsequent delivery of its contents may be made under computer control.

It has particular application in the storing and dispensing of multitudes of keys such as are encountered in automobile dealerships, garages, hotels, lodging houses, rental units, etc., but is useful in all situations where individual access to a plurality of articles must be restricted to particular persons or groups of persons, and where the current position of the article whether in storage, in use, on loan or otherwise absent from storage, must be known.

BACKGROUND OF THE INVENTION

As an example of current practice in an automobile dealership, there may be a large number of vehicles, each of which has its own individual key or keys. Certain of the salesmen may be assigned certain of the cars or trucks to which they can have access for sale or demonstration. Others may be permitted to deal with all of the vehicles except a chosen few high priced or specified units which may have their own specialized salesmen. The manager, and sometimes certain other designated people, will be allowed access to all vehicles.

Typically all the keys may merely be hung up in order on a board, sometimes, but not always, supervised by a senior or other member of the establishment responsible for security. Depending on the number of keys involved, such as boards can occupy a considerable surface area. The search for one particular key can waste a great deal of time, as can the accurate refiling of the keys, quite apart from not infrequent loss by the users. These inconveniences are very hard to control when there are many users and keys.

OBJECTS OF THE INVENTION

It is an object of the present invention to provide for the storage of numbers of articles of this kind where access from time to time must be gained by designated people, but in which access can be restricted to those intended.

It is a further object of the invention to provide an apparatus which is simple to use, and in which access to articles and redeposit of them in storage is quickly achieved with a minimum of involved time of the person concerned.

SUMMARY OF THE INVENTION

Apparatus for storing and dispensing articles comprises a cylindrically arranged array of a plurality of storage compartments, each of which has an exterior opening at the cylindrical surface. An enclosure surrounds the entire array. A moveable access port in the enclosure allows individual access to each respective storage compartment. Means are provided for positioning the array with respect to the enclosure by rotation about the axis of the cylinder and means are also provided for moving the access port with respect to the enclosure, at least with a component parallel to the axis so as to define a unique position for each compartment with respect to the access port and thereby provide access to each individual compartment respectively. Actuating means for the positioning means and the moving means is provided and each article is assigned a value corresponding to one of the storage compartments. The actuating means is controlled in accordance with selected of said assigned values for access to respective storage compartments storing the articles.

More particularly in accordance with one aspect of the invention there is provided an apparatus for storing and dispensing articles comprising:

a plurality of respective storage compartments for said articles in an array having a cylindrical exterior surface and defining an axis to said cylindrical surface, and an exterior opening to each respective compartment on said surface, an enclosure surrounding said storage compartment array, a moveable access port in said enclosure for allowing individual access to said storage compartments in said array, means for positioning said array with respect to said enclosure by rotation about said axis, means for moving said access port with respect to said enclosure with at least a component of movement parallel to said axis, to define a unique position for each compartment with respect to said access port for access to each individual compartment respectively actuating means for said positioning means and said moving means, each said article being assigned a value corresponding to one of said storage compartments, and means for controlling said actuating means in accordance with said selected assigned values for access to said respective storage compartments storing said articles.

In accordance with a second aspect of the invention there is provided a method for storing and dispensing articles which comprises the steps of:

arranging a plurality of respective storage compartments for said articles in an array having a cylindrical exterior surface and having an exterior opening for each respective compartment through the cylindrical surface defined by the array, providing a moveable access port for allowing individual access to said storage compartment in said array, positioning said array by rotating said array about said axis, moving said access port with at least a component of movement parallel to said axis for individual access through said port to each said compartment axially aligned with said port, assigning a value to each respective article corresponding to a unique storage compartment for that article, and moving the access port and the array in accordance with one of said assigned values to provide access to such compartment corresponding to said one assigned value.

BRIEF DESCRIPTION OF THE DRAWINGS

Preferred embodiments of the invention will now be described with reference to the accompanying drawings, wherein.

DESCRIPTION OF THE PREFERRED EMBODIMENT

Figure 1:
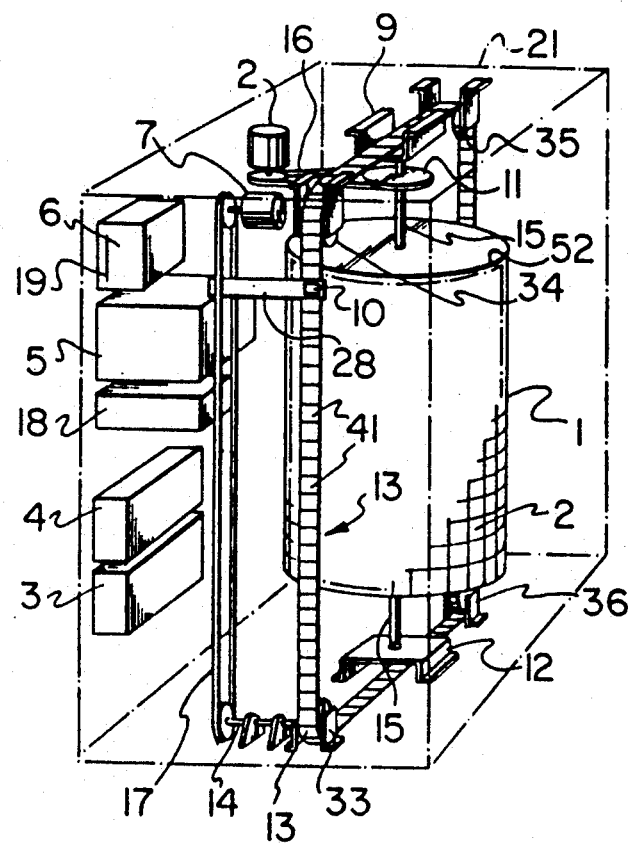
FIG. 1 is a schematic view of apparatus embodying the invention.

In FIG. 1, in which all components are enclosed within a protective cabinet 21 (shown in phantom for clarity), a cylindrical array 1 of article receiving compartments 2 comprises an assembly of vertically stacked layers of circularly arranged compartments. Each compartment is open at its radially outer vertical face and is mounted to a cooperating supporting framework carried on a vertical shaft 15 which can rotate in top and bottom bearing units 9 and 12 mounted to the cabinet 21. A sprocket 11 on shaft 15 is driven by chain 16 from a motor 2 (preferably a step or servomotor). On command from microcomputer 18 to the motor 2 (described in more detail later) the compartment assembly can thus be rotated.

Figure 2:
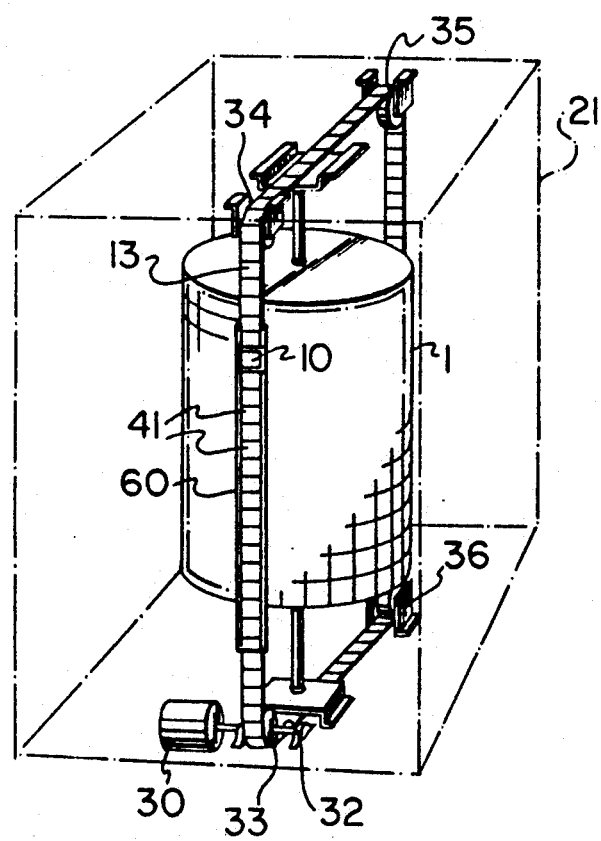
FIG. 2 is a perspective schematic view of the apparatus of FIG. 1 by using an alternative drive mechanism for the access port.
Figure 3:
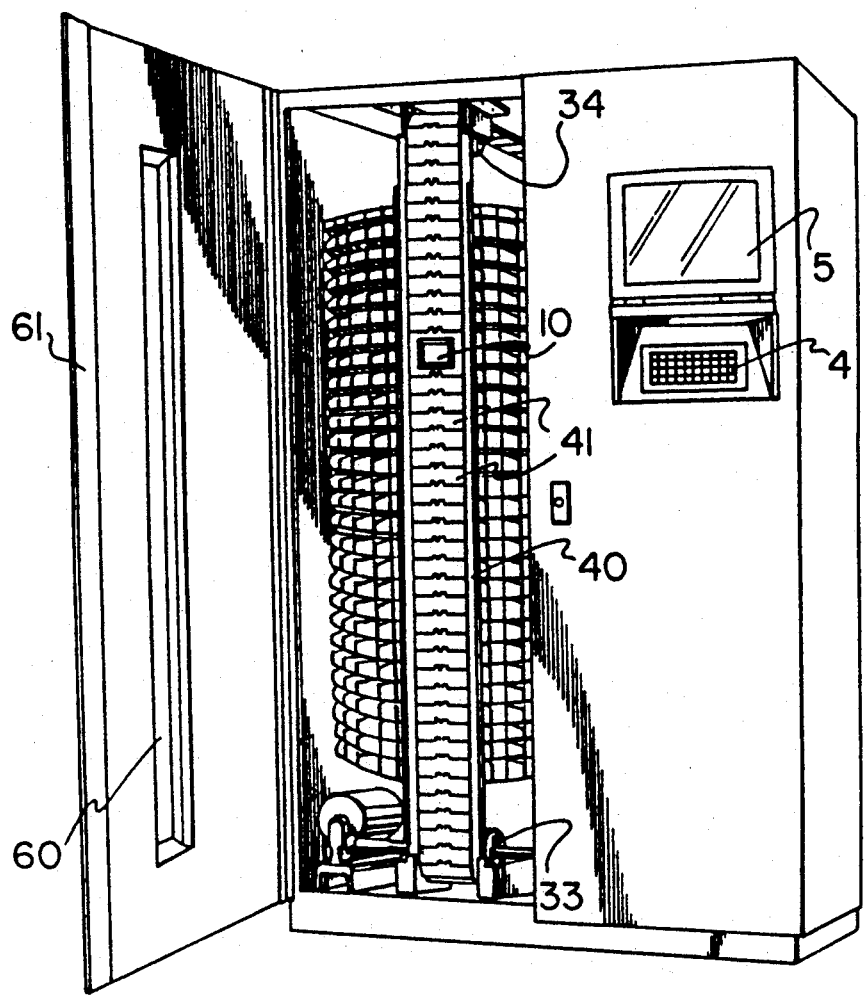
FIG. 3 is a perspective view of the outside of the apparatus similar to the embodiments of FIGS. 1 or 2, but showing a cabinet service door in open position.

Arranged in a vertical plane around the compartment assembly 1 is an access port mechanism 13' consisting of a continuous flexible belt 13, comprised of inflexible durable plate links 41 hinged to one another, and carried on two upper 34, 35 and two lower 33, 36 cooperating sprockets which are themselves mounted in the cabinet 21. The front part of the belt between sprockets 33 and 34 may be reinforced by a track 40 mounted in the cabinet 21 (see FIG. 3) in which the links run and which rigidifies the section against forcible deflection. The track may merely form a support backing on which the belt runs or it may embrace the front and back of the sides of the plates while allowing their free vertical movement. One of the links in belt 13 is a port link 10 which has a central opening and which, when aligned with the radially outer open face of a compartment, allows access through the opening (or port) into that compartment. The belt 13 can be moved in the vertical plane over its support sprockets by way of a drive bar 28 rigidly connected at one end to port link 10 and at its other to a chain or cable 17 driven by a motor 7 (preferably a step- or servomotor) and carried on idler pulley 14. Other means for moving belt 13 are possible, for instance, as illustrated in FIG. 2 (which omits details of motor 2 and its connected components), this can be effected by a drive motor 30 (replacing drive motor 7) and coupled by shaft 32 to sprocket 33. The belt is then moved because of its direct coupling to sprocket 33. The front of belt 13 lies in and coincident with a slot 60 (best seen in FIG. 3) in service door 61 at the front of the cabinet 21. When the apparatus is in use, with the service doors closed and locked, access into the cabinet is only possible through the opening in port link 10, since the remainder of slot 60 will be occupied by the solid plate links 41 of which the belt 13 is composed.

It will now be clear that by appropriate rotation of the assembly 1 using motor 2, access to any one of the compartments at the vertical level of the port link 10 at that time can be achieved. By changing the vertical portion of the port link 10 by movement of the drive motor 7 all of the compartments at each other level can be accessed. When not in use the port link 10 can be "parked" below the lowermost, or above the uppermost, level of the compartment layers. Preferably the slot 60 extends only between such lowermost and uppermost levels, so that when port link 10 is parked, only solid plate links 41 fill the slot and the cabinet and slot are thus completely closed off to the outside. The location of the slot 60 is illustrated diagrammatically in FIG. 2 also.

Figure 4:
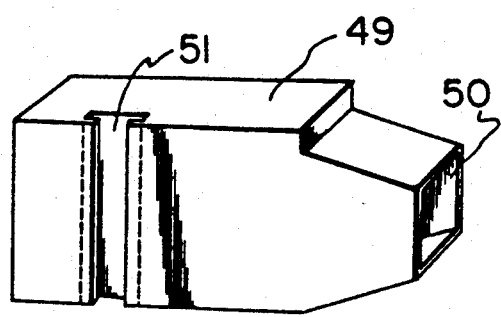
FIG. 4 is a perspective view of a typical compartment unit for a cylindrical array used in embodiments of the invention.

While the storage compartments 2 are shown somewhat diagrammatically in FIGS. 1 and 2, it is merely required that their openings be substantially on the surface of a cylinder (mathematically or geometrically speaking) though not necessary strictly in columns and layers aligned with the cylinder axis or in planes perpendicular to this axis. A typical compartment unit 49 in side perspective view is illustrated in FIG. 4 with open outer vertical face 50 and slot means 51 for attaching to a vertically running frame member mounted to the top 52 and the bottom (not shown) of cylindrical array 1, one vertical running member being provided for each column of compartments.

Cabinet 21 also encloses a computerized control system comprising printer 3, key pad 4, monitor 5, diskette drive 6 and microcomputer 18 (see FIG. 1). The printer, keypad, monitor, diskette drive, and microcomputer are operatively interconnected in a manner that will be clear to those skilled in the art and the output of microcomputer 18 is connected to drive motors 2 and 7.

Motors 2 and 7 are controlled by signals from microcomputer 18 in response to commands typed by an operator via keypad 4.

A control program is stored on a diskette 19 and read by diskette drive 6 as required. Those skilled in the art will appreciate that the control program may however be stored in firmware (such as a read only memory) associated with the microcomputer 18. Diskette 19 is also used to store the status of each compartment as well as personnel information files. Each compartment may have a status of unassigned, full or empty (assigned but the contents have been taken out by appropriate user). Each access transaction, i.e. the check in or check-out of an article or item, (a set of keys) for example is displayed on monitor 5, stored on diskette 19 by diskette drive 6 and printed on printer 3. The printed record of each transaction consists of the identification code of the operator who initiated the transaction, the type of transaction (i.e. check-in or check-out) and the date and time of the transaction. This provides a secure audit trail for tracking the whereabout of missing or checked out articles. Appropriate power supply (not shown) is provided for the motors 2 and 7 and the electronics.

Figure 5:
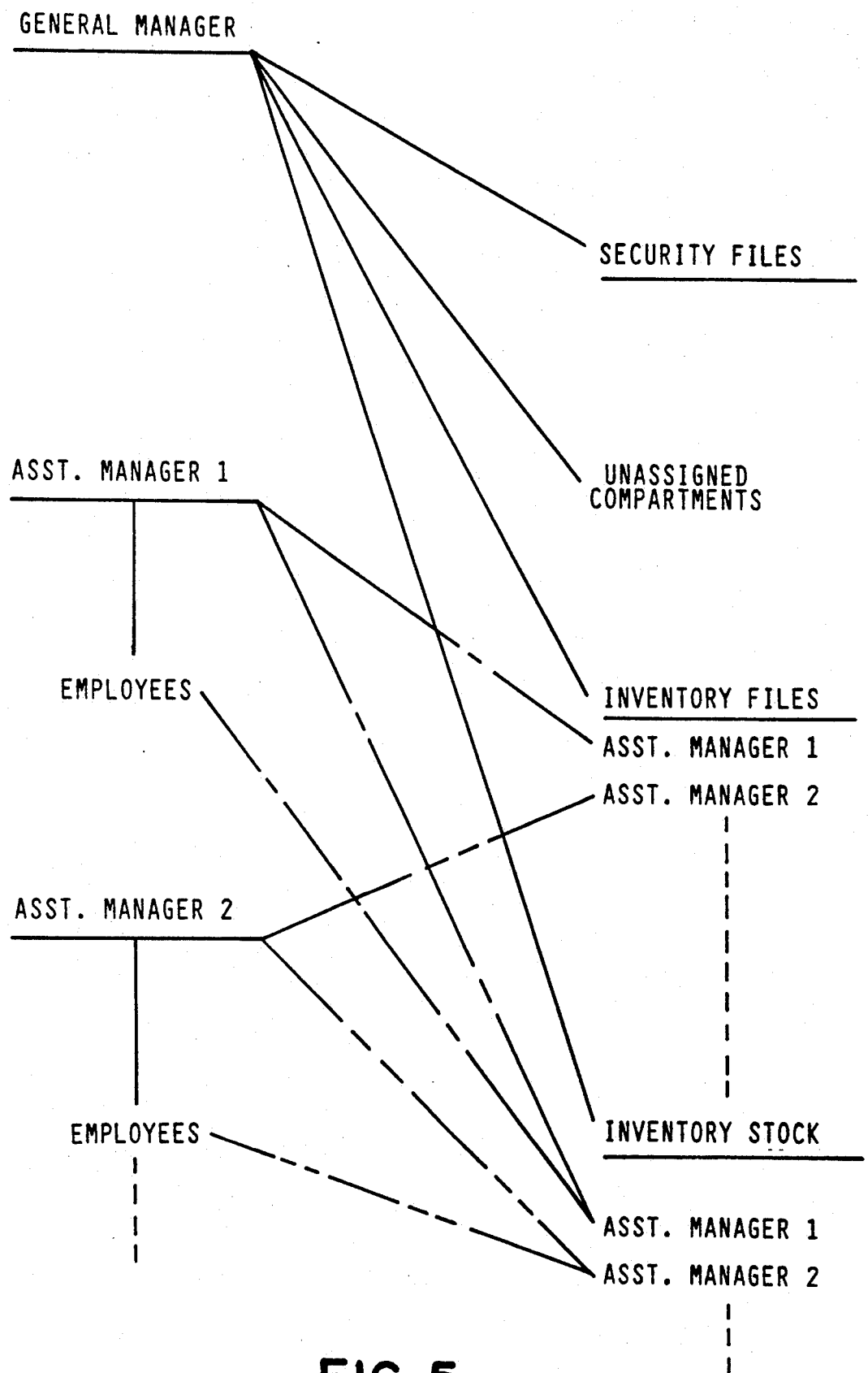
FIG. 5 is a schematic diagram of the organizational hierarchy predefined within the apparatus control program and the access privileges of each organizational class.

FIG. 5 illustrates schematically the organizational heirachy predefined in the control program of the apparatus. For the purpose of clarity, all positions are arranged vertically, however, all assistant general managers are of equal rank and all employees are of equal rank in terms of access rights. Access privileges, as defined in the inventory files, are assigned and controlled by the General Manager. Only the General Manager can access and change the control security files which define the access privileges to the inventory file records. Each inventory file which corresponds to one compartment in the compartment array, contains a field to store the identification code of the assistant manager responsible for the contents (stock) of that compartment. This assistant manager may access any compartment inventory record file assigned to his responsibility to change the contents of the compartment, or the identification code of the contents of the compartment, however, he may not access inventory files which are not assigned to his responsibility. Employees, as illustrated in FIG. 5, may only access the contents of the compartments (inventory stock) assigned to their particular assistant manager. Each employee access code may be assigned to one and only one assistant manager. Employees may not access any control security files or inventory files.

Figure 6:
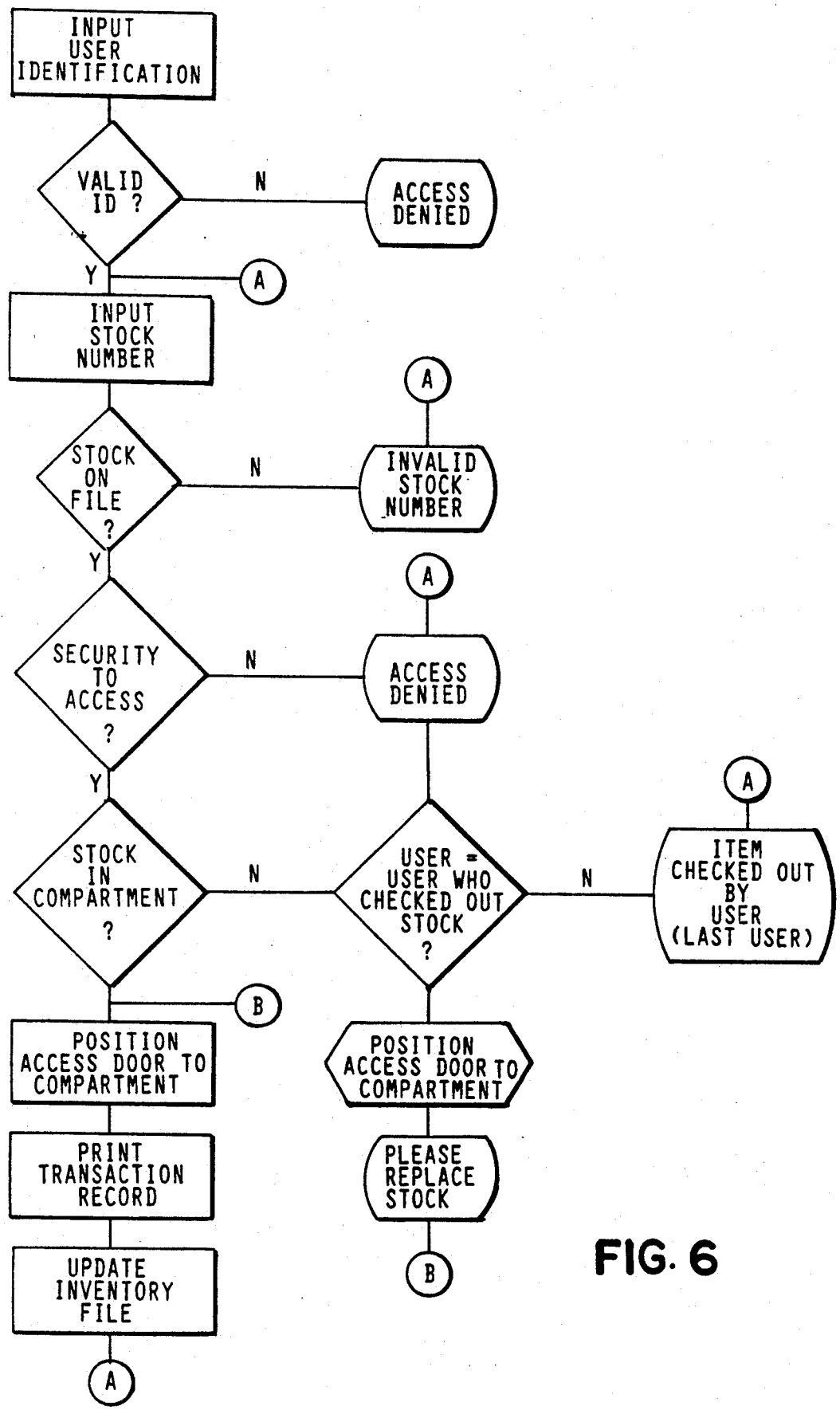
FIG. 6 is a simplified flow chart of a computer program for controlling access to compartments of the apparatus.

FIG. 6 illustrates a simplified flow chart of the program which controls access to the various compartments. When access is desired, a user must first enter his identification code. If the user code entered is not a valid code, access is denied. If the code is valid, i.e., defined in the personnel file, the user is prompted to type the identification of the article he wishes to access.

The program then inspects the records of the inventory file to determine whether the article sought is in stock (i.e. is assigned to a compartment). If there is no inventory record found with a stock identification equal to the one requested, an "invalid stock identification" message is displayed on the monitor and a new stock identification may be entered. If an inventory record is found, the responsible assistant manager in the inventory record is compared with the assistant manager in the user's personnel record. If the two records contain the same assistant manager identification code, processing continues, otherwise, processing for that stock item halts and access to that stock item compartment is denied. If processing continues, the inventory record is checked again to determine the status of the item. A stock item may have a status of "in", i.e. currently in the associated compartment or "out", i.e. checked out by some eligible user.

If the inventory record shows that the item is out, the program compares the identification code which is stored in the inventory file, of the user requesting access with the identification code of the user who checked out the item which is stored in the inventory file. If the two identification codes match, i.e., the user wishing to access a stock compartment is the user who last checked out that stock item, the program branches to perform the following actions.

The cylinder assembly 1 is moved by motor 2 to a position where the desired compartment is positioned directly behind the access port belt 13. The access port link 10 is moved by motor 7, or 30 until it is directly aligned with the proper compartment. Lastly, a message is displayed on the monitor console 5 which reads "Please Replace Stock", and the article is accepted. Upon indication by the operator by pressing an appropriate key on the keyboard that the article has been returned to the compartment the machine recloses the compartment by moving the access port link 10 to the "parked" position as described earlier, prints a record of the transaction, and updates the inventory filed to indicate that the stock article is "in" If the inventory record indicates that the stock item is out and the user wishing to access it is not the user who last checked it out, the program displays the message such as "Key checked out by (last user), where (last user) equals the name of the last user to have checked out the article.

If the inventory record shows that the stock article is in its compartment the program directs motors 2 and 7 or 30 to position the access port to the appropriate compartment, the machine waits for the stock item to be removed, on indication by the operator that this has been done such as pressing an appropriate key on the keyboard it then recloses the compartment by moving access port 10 back to its parked position, prints a record of the transaction on the printer and updates the inventory record with an "item out" status.

Typically the program will perform the following steps when ready to access a compartment;

1. It first finds the current colum of compartments aligned with the access port belt (from the diskette if just restarted, or from memory if a transaction has happened since the last boot).

2. Finds current row (vertical level) of the port link 10 (or park position if it is parked).

3. Finds column and row of desired compartment from a table stored on diskette.

4. Computes the shortest route to reach the column and appropriate direction of rotation for the cylinder assembly 1.

5. Sends a digital signal to motor 2 (if it is a stepping or servo motor) to execute the required amount of rotation. An alternative is to send a close switch signal to an analogue/digital converter to start the cylinder motor 2 and subsequently send an open switch after the appropriate time for rotation to the desired position has elapsed.

6. Computes the row differences between door position and desired compartment.

7. As in step 5 above, sends a digital signal to motor 7 or 30 (if it is a stepping or servo motor) to move the access door to the desired position represented by the digital signal. An alternative analogue timed arrangement as in step 5 might also be used.

The present invention, therefore, is well adapted to carry out the objects and advantages mentioned. While preferred embodiments of the invention have been set out for purposes of disclosure, numerous changes in the details of construction and arrangement of parts and steps of the method will readily suggest themselves to those skilled in the art and which are encompassed within the spirit of the invention and the scope of the following claims.

What is claimed is:

1. An apparatus having a plurality of individual storage compartments for receiving and storing articles, comprising: means for allowing access to such compartments one at a time and to articles stored therein and upon return of such articles access to the same compartments for again storing them therein, said individual storage compartments for said articles being arranged in an array having a cylindrical exterior surface rotatable about the central axis of said cylindrical surface, and a separate exterior opening in said surface to each individual compartment; an enclosure surrounding said storage compartment array, wherein, a movable access port in said enclosure which upon alignment with a selected storage compartment permits individual access to that particular storage compartments in said array, a longitudinally extending slot in said enclosure with at least a component of the length thereof parallel to said central axis, a belt received in said slot and comprising a series of contiguous transversely extending plate links, one portion of said belt having at least one of said plate links apertured to define an opening in said belt with the others of said plate links forming said belt extending on either side of said opening being unapertured and preventing access through said belt except through said opening, said opening forming said access port, track means mounted to said enclosure movably retaining said belt in said slot contiguous with an exterior surface of said enclosure, means for positioning said array with respect to said enclosure by rotation of said array about said axis, means for moving said belt with respect to said enclosure with at least a component of movement parallel to said axis, to define a unique position for each compartment with respect to said access port to provide access to each individual compartment respectively, actuating means for said positioning means and said moving means, each said article being assigned a value corresponding to one of said storage compartments, and means for controlling said actuating means in accordance with said selected assigned values for access to said respective compartments storing said articles.

2. An apparatus as defined in claim 1, further comprising, means associated with said controlling means for changing said assigned values.

3. An apparatus as defined in claim 2 having keyboard input means connected to said controlling means.

4. An apparatus as defined in claim 1, said controlling means comprising user access security means for permitting access only to selected ones of said articles in accordance with further values assigned to individual users.

5. An apparatus as defined in claim 4 having keyboard input means connected to said controlling means.

6. An apparatus as defined in claim 1, said controlling means comprising recording means for recording transactions of said apparatus and for displaying previous transaction data for each respective article for which access is attempted.

7. An apparatus as defined in claim 6, wherein said previous transaction data is displayed only when said article for which access is attempted is not in its respective compartment.

8. An apparatus as defined in claim 1, wherein said controlling means comprises:
means determining position data of said array with respect to said access port,
means for receiving and said storing input data for access to a selected article,
means for comparing said input data and said position data from said determining means,
and means for operating said actuating means for said positioning means and moving means to move said array to align the selected compartment with said access port utilizing minimum distances for effecting alignment and access to the storage compartment for said selected article.

9. An apparatus as defined in claim 1, further comprising printer means connected to said controlling means for permanently recording transactions of said apparatus.

10. An apparatus as defined in claim 1, further comprising video monitor means interconnected to said control means.

11. An apparatus as defined in claim 1, comprising key board input means connected to said controlling means.

12. An apparatus as defined in claim 1, said controlling means comprising programmed computer means for displaying the occupancy status of each individual storage compartment.

* * * * *

UNITED STATES PATENT AND TRADEMARK OFFICE
CERTIFICATE OF CORRECTION

PATENT NO. : 5,212,649
DATED : May 18, 1993
INVENTOR(S) : Florent Pelletier et al.

It is certified that error appears in the above-indentified patent and that said Letters Patent is hereby corrected as shown below:

Column 4, line 53:
    "whereabout" should be --whereabouts--.
Column 5, line 61:
    After ""in"" insert --.--.
Column 6, line 11:
    "colum" should be --column--.'

Signed and Sealed this

Third Day of May, 1994

Attest:

BRUCE LEHMAN

Attesting Officer    Commissioner of Patents and Trademarks